US012293746B2

(12) United States Patent
Donier et al.

(10) Patent No.: US 12,293,746 B2
(45) Date of Patent: May 6, 2025

(54) SYSTEMS AND METHODS FOR GENERATING A MIXED AUDIO FILE IN A DIGITAL AUDIO WORKSTATION

(71) Applicant: Soundtrap AB, Stockholm (SE)

(72) Inventors: Jonathan Donier, Lausanne (CH); François Pachet, Paris (FR); Pierre Roy, Paris (FR); Olumide John Okubadejo, Paris (FR)

(73) Assignee: SOUNDTRAP AB, Stockholm (SE)

( * ) Notice: Subject to any disclaimer, the term of this patent is extended or adjusted under 35 U.S.C. 154(b) by 741 days.

(21) Appl. No.: 17/515,184

(22) Filed: Oct. 29, 2021

(65) Prior Publication Data

US 2023/0135778 A1 May 4, 2023

(51) Int. Cl.
*G10H 1/00* (2006.01)
*G10H 1/40* (2006.01)

(52) U.S. Cl.
CPC ......... *G10H 1/0066* (2013.01); *G10H 1/0008* (2013.01); *G10H 1/40* (2013.01); *G10H 2220/106* (2013.01); *G10H 2220/126* (2013.01); *G10H 2250/311* (2013.01)

(58) Field of Classification Search
CPC ...... G10H 1/0066; G10H 1/0008; G10H 1/40; G10H 2220/106; G10H 2220/126; G10H 2250/311
USPC .......................................................... 84/645
See application file for complete search history.

(56) References Cited

U.S. PATENT DOCUMENTS 10,008,188 B1 * 6/2018 Dabon ..................... G10G 1/04
2003/0023421 A1 * 1/2003 Finn ..................... G10H 1/0008 707/E17.101
2005/0015258 A1 * 1/2005 Somani ................ G10H 1/0008 704/278

(Continued)

FOREIGN PATENT DOCUMENTS

CN 106652997 B 7/2020
CN 111681631 A * 9/2020 ........... G06F 16/683

(Continued)

OTHER PUBLICATIONS

Diemo Schwarz, A System for Data-Driven Concatenative Sound Synthesis, Digital Audio Effects (DAFx), Dec. 2000 (Dec. 7, 2000), Verona, Italy. pp. 97-102. ffhal-01161115f, https://hal.science/hal-01161115/document (Year: 2000).*

(Continued)

*Primary Examiner* — Christina M Schreiber
(74) *Attorney, Agent, or Firm* — Alston & Bird LLP

(57) ABSTRACT

An electronic device receives a source audio file from a user of a digital audio workstation and a target MIDI file, the target MIDI file comprising digital representations for a series of notes. The electronic device generates a series of sounds from the target MIDI file, each respective sound in the series of sounds corresponding to a respective note in the series of notes. The electronic device divides the source audio file into a plurality of segments. For each sound in the series of sounds, the electronic device matches a segment from the plurality of segments to the sound based on a weighted combination of features identified for the corresponding sound. The electronic device generates an audio file in which the series of sounds from the target MIDI file are replaced with the matched segment corresponding to each sound.

20 Claims, 9 Drawing Sheets

(56) References Cited

U.S. PATENT DOCUMENTS

| | | | | |
|---|---|---|---|---|
| 2007/0289432 | A1* | 12/2007 | Basu | G10H 7/008 84/609 |
| 2008/0190272 | A1* | 8/2008 | Taub | G10H 1/0058 84/645 |
| 2009/0249945 | A1* | 10/2009 | Yamashita | G10H 1/40 84/613 |
| 2015/0243269 | A1* | 8/2015 | Wieder | G10H 1/0066 84/609 |
| 2019/0287502 | A1* | 9/2019 | Kiely | G10H 1/0066 |
| 2021/0125593 | A1* | 4/2021 | Pachet | G10H 1/0025 |
| 2021/0158791 | A1* | 5/2021 | Pachet | G10H 1/0025 |
| 2022/0059064 | A1* | 2/2022 | Roy | G10H 1/0025 |
| 2022/0066732 | A1* | 3/2022 | Roxbergh | G10H 1/0008 |
| 2023/0135778 | A1* | 5/2023 | Donier | G10H 1/40 84/645 |
| 2023/0139415 | A1* | 5/2023 | Bittner | G10H 1/40 84/645 |
| 2023/0251820 | A1* | 8/2023 | Roxbergh | G06F 3/165 84/625 |

FOREIGN PATENT DOCUMENTS

| | | | | |
|---|---|---|---|---|
| CN | 116034421 A | * | 4/2023 | G10H 1/0008 |
| DK | 202170064 A1 | * | 5/2022 | |
| KR | 2014054810 A | * | 5/2014 | |

OTHER PUBLICATIONS

Joel Jogy, How I Understood: What features to consider while training audio files?, Towards Data Science, Sep. 2019 (Sep. 6, 2019), https://towardsdatascience.com/how-i-understood-what-features-to-consider-while-training-audio-files-eedfb6e9002b (Year: 2019).*

Vishnu R, Dummies guide to audio analysis, Aug. 2020) (Aug. 20, 2020), Kaggle, https://www.kaggle.com/code/vishnurapps/dummies-guide-to-audio-analysis (Year: 2020).*

Spotify AB, Extended European Search Report, EP22200461.6, Mar. 22, 2023, 13 pgs.

Diemo Schwartz, "A System for Data-Driven Concatenative Sound Synthesis", Proceedings of Cost G-6 Conference on Digital Audio Effects, XP002464415, Verona, Italy, Dec. 7-9, 2000, Dec. 7, 2000, 6 pgs.

Roger B. Dannenberg, "Concatenative Synthesis Using Score-Aligned Transcriptions", International Computer Music Conference Proceedings, XP093031229, New Orleans, LA, Nov. 1, 2006, 4 pgs.

Ari Lazier et al., "Mosievius: Feature Driven Interactive Audio Mosaicing", Proc. of the 6$^{th}$ Int. Conference on Digital Audio Effects (DAFx-03), XP093031308, London, United Kingdom, Sep. 8-11, 2003, Aug. 1, 2003, 7 pgs.

Joel Jogy, "How I Understood: What features to consider while training audio files?", Towards Data Science, XP093031240, Sep. 6, 2019, 7 pgs.

Vishnu R, "Dummies guide to audio analysis", www.kaggle.com, XP093031668, Aug. 20, 2020, 13 pgs.

PC Magazine, "Soundfront", [Retrieved on Nov. 20, 2023], Retrieved via the Wayback Machine <URL: https://web.archive.org/web/20210517020542/https://www.pcmag.com/encyclopedia/term/soundfont>, (May 17, 2021) 4 pages.

Sahidullah, M., & Saha, G. (2012). Design, Analysis and Experimental Evaluation of Block-based Transformation in MFCC Computation for Speaker Recognition. *Speech Communication*, 54(4), 543-565.

Lu, L., & Hanjalic, A. (2009). Audio Segmentation. In *Encyclopedia of Database Systems* (pp. 167-172). Springer.

* cited by examiner

SYSTEMS AND METHODS FOR GENERATING A MIXED AUDIO FILE IN A DIGITAL AUDIO WORKSTATION

TECHNICAL FIELD

The disclosed embodiments relate generally to generating audio files in a digital audio workstation (DAW), and more particularly, to mixing portions of an audio file with a target MIDI file by analyzing the content of the audio file.

BACKGROUND

A digital audio workstation (DAW) is an electronic device or application software used for recording, editing and producing audio files. DAWs come in a wide variety of configurations from a single software program on a laptop, to an integrated stand-alone unit, all the way to a highly complex configuration of numerous components controlled by a central computer. Regardless of configuration, modern DAWs generally have a central interface that allows the user to alter and mix multiple recordings and tracks into a final produced piece.

DAWs are used for the production and recording of music, songs, speech, radio, television, soundtracks, podcasts, sound effects and nearly any other situation where complex recorded audio is needed. MIDI, which stands for "Musical Instrument Digital Interface" is a common data protocol used for storing and manipulating audio data using a DAW.

SUMMARY

Some DAWs allow users to select an audio style (e.g., a SoundFont™) from a library of audio styles to apply to a MIDI file. For example, MIDI files include instructions to play notes, but do not inherently include sounds. Accordingly, to play a MIDI file, stored recordings of instruments and sounds (e.g., referred to herein as audio styles) are applied to the notes so that the MIDI file is played with corresponding sounds. SoundFont™ is an example of an audio style bank (e.g., library of audio styles) that includes a plurality of stored recordings of instruments and sounds that can be applied to a MIDI file.

For example, an audio style is applied to a MIDI file such that a series of notes represented in the MIDI file, when played, has the selected audio style. This enables the user to apply different audio textures to a same set of notes when creating a composition, by selecting and changing the audio style applied to the series of notes. However, the library of audio styles available to the user is typically limited to preset and/or prerecorded audio styles.

Some embodiments of the present disclosure solve this problem by allowing the user of a DAW to import a source audio file (e.g., that is recorded by the user of the DAW) and apply segments of the source audio file to a target MIDI file. In this manner, a user can replace drum notes with, e.g., recorded sounds of the user tapping a table, clicking, or beatboxing. In some embodiments, the process by which the rendered audio is generated involves: pre-processing notes in the target MIDI file (e.g., by applying an audio style), segmentation of the source audio file for the identification of important audio events and sounds (segments), matching these segments to the pre-processed notes and, finally, mixing of the final audio and output. Accordingly, the provided system enables a user to overlay different textures from the segmented audio file to a base MIDI file by applying the segments (e.g., events) to the notes.

To that end, in accordance with some embodiments, a method is performed at an electronic device. The method includes receiving a source audio file from a user of a digital audio workstation (DAW) and a target MIDI file, the target MIDI file comprising digital representations for a series of notes. The method further includes generating a series of sounds from the target MIDI file, each respective sound in the series of sounds corresponding to a respective note in the series of notes. The method includes dividing the source audio file into a plurality of segments. The method further includes, for each sound in the series of sounds, matching a segment from the plurality of segments to the sound based on a weighted combination of features identified for the corresponding sound. The method includes generating an audio file in which the series of sounds from the target MIDI file are replaced with the matched segment corresponding to each sound.

Further, some embodiments provide an electronic device. The device includes one or more processors and memory storing one or more programs for performing any of the methods described herein.

Further, some embodiments provide a non-transitory computer-readable storage medium storing one or more programs configured for execution by an electronic device. The one or more programs include instructions for performing any of the methods described herein.

Thus, systems are provided with improved methods for generating audio content in a digital audio workstation.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

DETAILED DESCRIPTION

Figure 1:
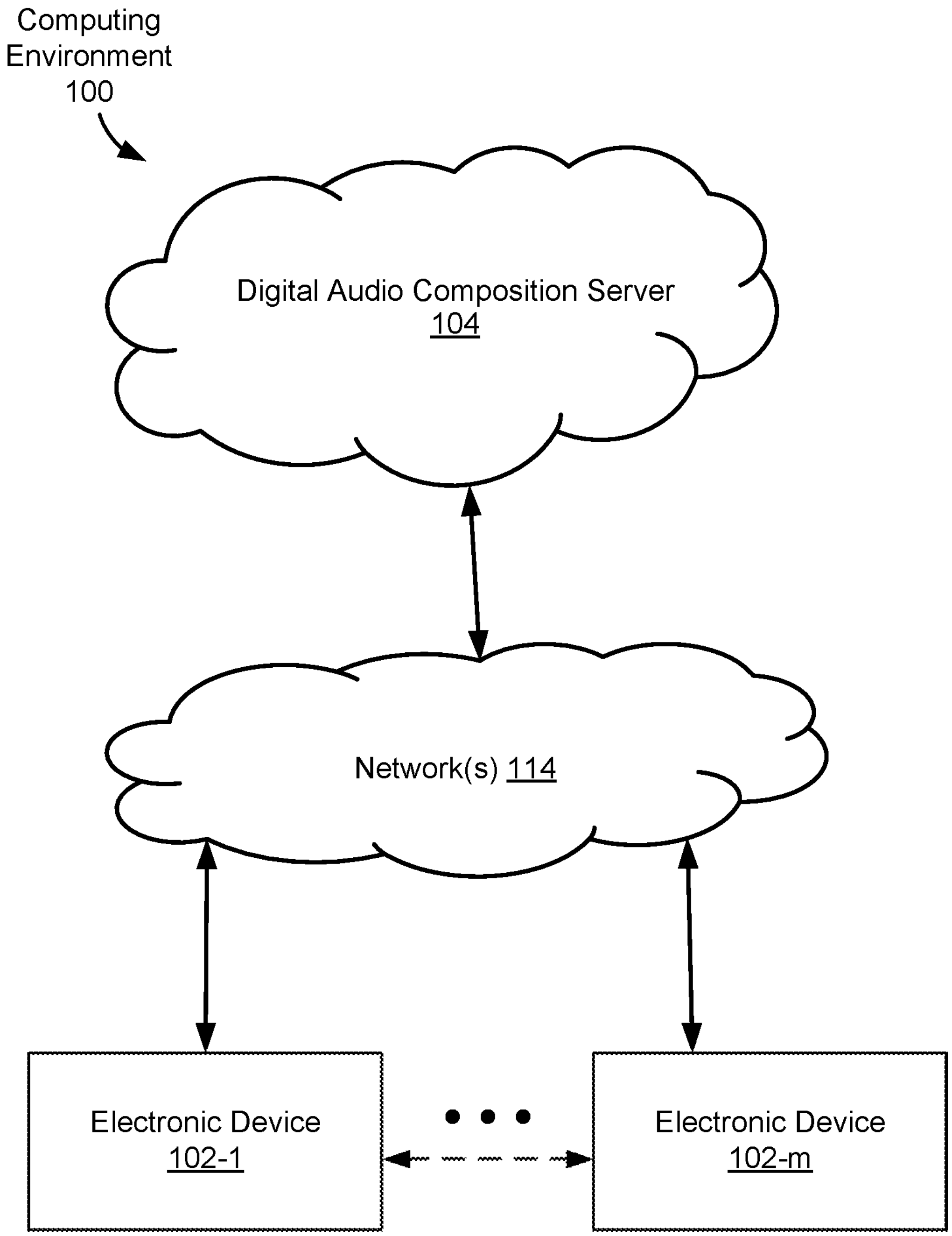
FIG. 1 is a block diagram illustrating a computing environment, in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc., are, in some instances, used herein to describe various elements, these elements should not be limited by these terms. These terms are used only to distinguish one element from another. For example, a first user interface element could be termed a second user interface element, and, similarly, a second user interface element could be termed a first user interface element, without departing from the scope of the various described embodiments. The first user interface element and the second user interface element are both user interface elements, but they are not the same user interface element.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As noted in the summary section above, some embodiments of the present disclosure solve this problem by allowing the user of a DAW to import a source audio file (e.g., that is recorded by the user of the DAW) and apply segments of the source audio file to a target MIDI file. The process by which the rendered audio is generated involves pre-processing notes in the target MIDI file (e.g., by applying an audio style), segmentation of the source audio file for the identification of important audio events and sounds (segments), matching these segments to the pre-processed notes and finally mixing of the final audio and output. Before delving into the description of the figures, a brief description of these operations is provided below.

TARGET MIDI FILE PREPARATION. A target MIDI file (e.g., a drum loop) may be obtained in any of a variety of ways (described in greater detail throughout this disclosure). Regardless of how the target MIDI file is obtained, in some embodiments, the target MIDI file is separated into its MIDI notes. Using a pre-chosen audio style (e.g., chosen by the user and sometimes called a drum font), each note is converted into a note audio sound. The choice of audio style affects the matching as it determines the sound and thus the dominant frequencies. In some embodiments, for each note audio sound, a Mel spectrogram is computed, after which the Mel Frequency Cepstral Coefficients (MFCCs) are also computed.

SOURCE AUDIO FILE SEGMENTATION. Segmentation is the process by which an audio file is separated into fixed-length or variable-length segments. In some embodiments, each segment represents a unique audio event. In some embodiments, determining a unique audio event involves segmentation, in which the waveform of the audio is examined, and semantically meaningful temporal segments are extracted. In some embodiments, the segmentation is parameterized to be able to control the granularity of segmentation (biased towards small segmentations or large segmentations). Granularity does not define a fixed length for the segmentations but determines how unique an audio event must be, as compared to its surrounding before it, to be considered to be a segment. Granularity hence defines localized distinctness and this, in turn, means that smaller segments have to be very distinct from their surroundings to be considered to be a segment. In some embodiments, a peak finding algorithm is applied, and the segments are identified. As with the MIDI preparation, the Mel spectrogram and the MFCCs are also prepared for each segment.

MATCHING. The audio segments from the source audio file are matched to the note audio sounds using one or more matching criteria. In some embodiments, the matching criteria are based on a weighted combination of four different feature sets (which together form respective vectors for the note audio sounds and the audio segments: the MFCCs, the low frequencies, middle frequencies and the high frequencies. Distances between vectors representing the note audio sounds and vectors representing the audio segments from the source audio file are computed based on this weighted combination.

In some embodiments, in a so-called "standard mode," (e.g., a best fit match) every MIDI note is replaced by the segment that closely matches based on the computed distance, irrespective of how many times the note appears within the MIDI sequence. In some embodiments, in a so-called "variance mode," the distances are converted into a probability distribution and the matching audio segment is drawn from the probability distribution, with a higher chance of being chosen for closer distances. In some embodiments, the user may select a variance parameter for the probability distribution that defines the randomness of selecting a more distant vector. In some embodiments, the user can toggle between the standard mode and the variance mode.

In some circumstances (e.g., in which the target MIDI file represents percussion and thus a beat/rhythm of the composition), however, a fixed timing is necessary to ensure that the resulting audio does not deviate too much from the target MIDI file. To compensate for this, certain instruments' (e.g., kick and hi-hat) notes are replaced only by the best segment, even in variance mode.

MIXING. During the mixing operation, the note audio sounds are replaced or augmented with the matched audio segments. In some embodiments, mixing is performed in a way that ensures that drum elements (e.g., kick and hi-hat) are center panned while other elements are panned based on the volume adjustment needed for the segment. This volume adjustment is calculated based on the difference in gain between the replacing segment and the audio of the MIDI note.

From the above description, it should be understood that MIDI files store a series of discrete notes with information describing how to generate an audio sound from each discrete note (e.g., including parameters such as duration, velocity, etc.). Audio files, in contrast, store a waveform of the audio content, and thus do not store information describing discrete notes (e.g., until segmentation is performed).

FIG. 1 is a block diagram illustrating a computing environment 100, in accordance with some embodiments. The computing environment 100 includes one or more electronic devices 102 (e.g., electronic device 102-1 to electronic device 102-*m*, where m is an integer greater than one) and one or more digital audio composition servers 104.

The one or more digital audio composition servers 104 are associated with (e.g., at least partially compose) a digital audio composition service (e.g., for collaborative digital audio composition) and the electronic devices 102 are logged into the digital audio composition service. An example of a digital audio composition service is SOUNDTRAP, which provides a collaborative platform on which a plurality of users can modify a collaborative composition.

One or more networks 114 communicably couple the components of the computing environment 100. In some embodiments, the one or more networks 114 include public communication networks, private communication networks, or a combination of both public and private communication networks. For example, the one or more networks 114 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, electronic devices 102-1 and 102-*m* are the same type of device (e.g., electronic device 102-1 and electronic device 102-*m* are both speakers). Alternatively, electronic device 102-1 and electronic device 102-*m* include two or more different types of devices. In some embodiments, electronic device 102-1 includes a plurality (e.g., a group) of electronic devices.

In some embodiments, electronic devices 102-1 and 102-*m* send and receive audio composition information through network(s) 114. For example, electronic devices 102-1 and 102-*m* send requests to add or remove notes, instruments, or effects to a composition, to 104 through network(s) 114.

In some embodiments, electronic device 102-1 communicates directly with electronic device 102-*m* (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., Bluetooth/Bluetooth Low Energy (BLE)) communication technologies, radio-frequency-based near-field communication technologies, infrared communication technologies, etc.) with electronic device 102-*m*. In some embodiments, electronic device 102-1 communicates with electronic device 102-*m* through network(s) 114. In some embodiments, electronic device 102-1 uses the direct connection with electronic device 102-*m* to stream content (e.g., data for media items) for playback on the electronic device 102-*m*.

In some embodiments, electronic device 102-1 and/or electronic device 102-*m* include a digital audio workstation application 222 (FIG. 2) that allows a respective user of the respective electronic device to upload (e.g., to digital audio composition server 104), browse, request (e.g., for playback at the electronic device 102), select (e.g., from a recommended list) and/or modify audio compositions (e.g., in the form of MIDI files).

Figure 2:
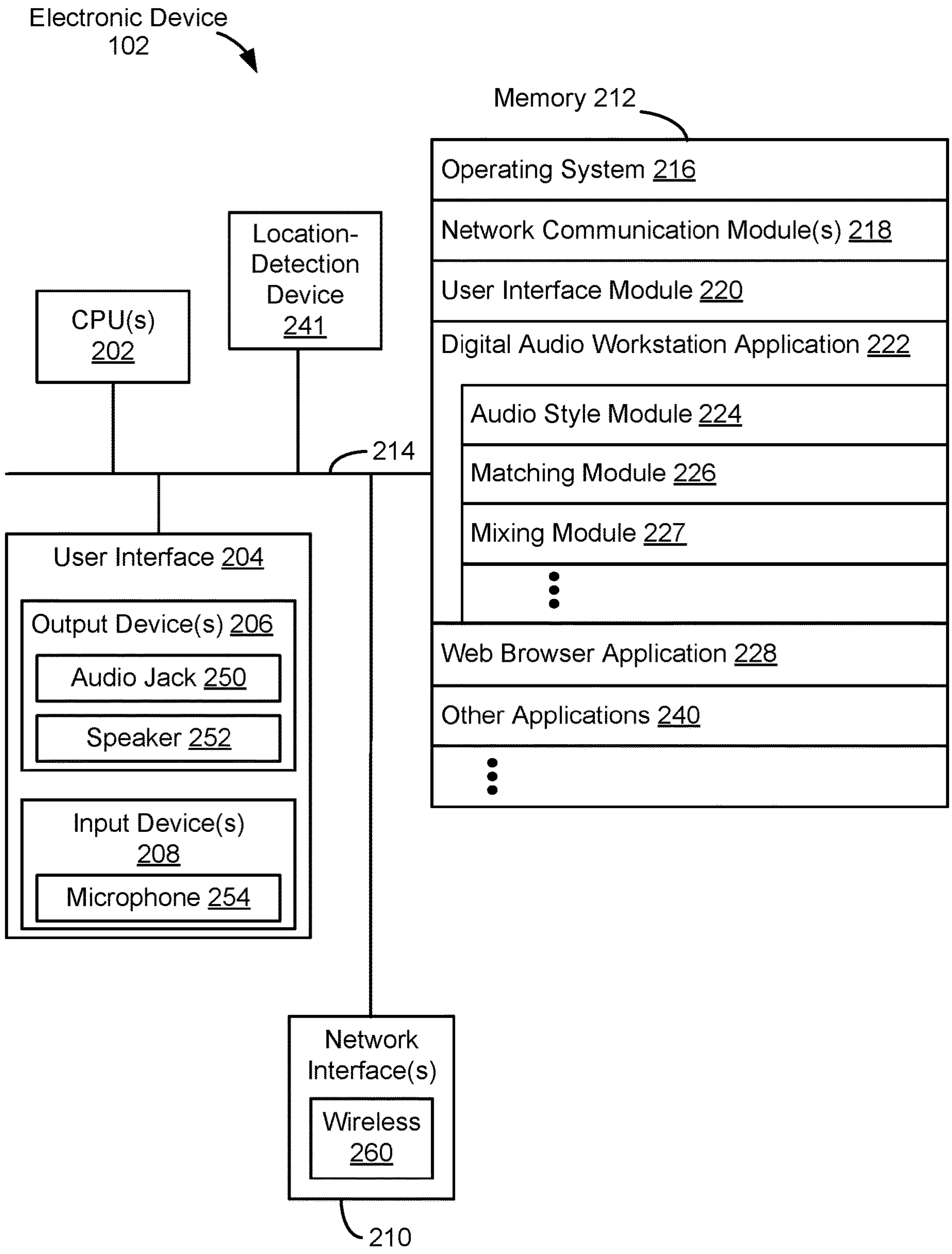
FIG. 2 is a block diagram illustrating a client device, in accordance with some embodiments.

FIG. 2 is a block diagram illustrating an electronic device 102 (e.g., electronic device 102-1 and/or electronic device 102-*m*, FIG. 1), in accordance with some embodiments. The electronic device 102 includes one or more central processing units (CPU(s), e.g., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard (e.g., a keyboard with alphanumeric characters), mouse, track pad, a MIDI input device (e.g., a piano-style MIDI controller keyboard) or automated fader board for mixing track volumes. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone 254) to capture audio (e.g., vocals from a user).

Optionally, the electronic device 102 includes a location-detection device 241, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a digital audio composition server 104, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, and/or or other wireless (e.g., Bluetooth-compatible) devices (e.g., for streaming audio data to the electronic device 102 of an automobile). Furthermore, in some embodiments, the wireless interface 260 (or a different communications interface of the one or more network interfaces 210) enables data communications with other WLAN-compatible devices (e.g., electronic device(s) 102) and/or the digital audio composition server 104 (via the one or more network(s) 114, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the electronic device 102 to other computing devices (e.g., other electronic device(s) 102, and/or digital audio composition server 104) via the one or more network interface(s) 210 (wired or wireless) connected to one or more network(s) 114;
- a user interface module 220 that receives commands and/or inputs from a user via the user interface 204 (e.g., from the input devices 208) and provides outputs for playback and/or display on the user interface 204 (e.g., the output devices 206);
- a digital audio workstation application 222 (e.g., for recording, editing, suggesting and producing audio files such as musical composition). Note that, in some embodiments, the term “digital audio workstation” or “DAW” refers to digital audio workstation application 222 (e.g., a software component). In some embodiments, digital audio workstation application 222 also includes the following modules (or sets of instructions), or a subset or superset thereof:
  - an audio style module 224 for storing and/or applying one or more audio styles to one or more MIDI files;
  - a matching module 226 for matching segments of an audio file with each sound represented by a MIDI file (e.g., by matching vectors for the notes of the MIDI file with vectors representing the segments of the audio file and selecting a segment based on vector distances for a sound); and
  - a mixing module 227 for combining the matched segments with the sounds to generate a mixed audio file that includes the overlaid textures (e.g., from the segments of the audio file) over the base MIDI file by applying the textures to the notes of the MIDI file.
- a web browser application 228 (e.g., Internet Explorer or Edge by Microsoft, Firefox by Mozilla, Safari by Apple, and/or Chrome by Google) for accessing, viewing, and/or interacting with web sites. In some embodiments, rather than digital audio workstation application 222 being a stand-alone application on electronic device 102, the same functionality is provided through a web browser logged into a digital audio composition service;
- other applications 240, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
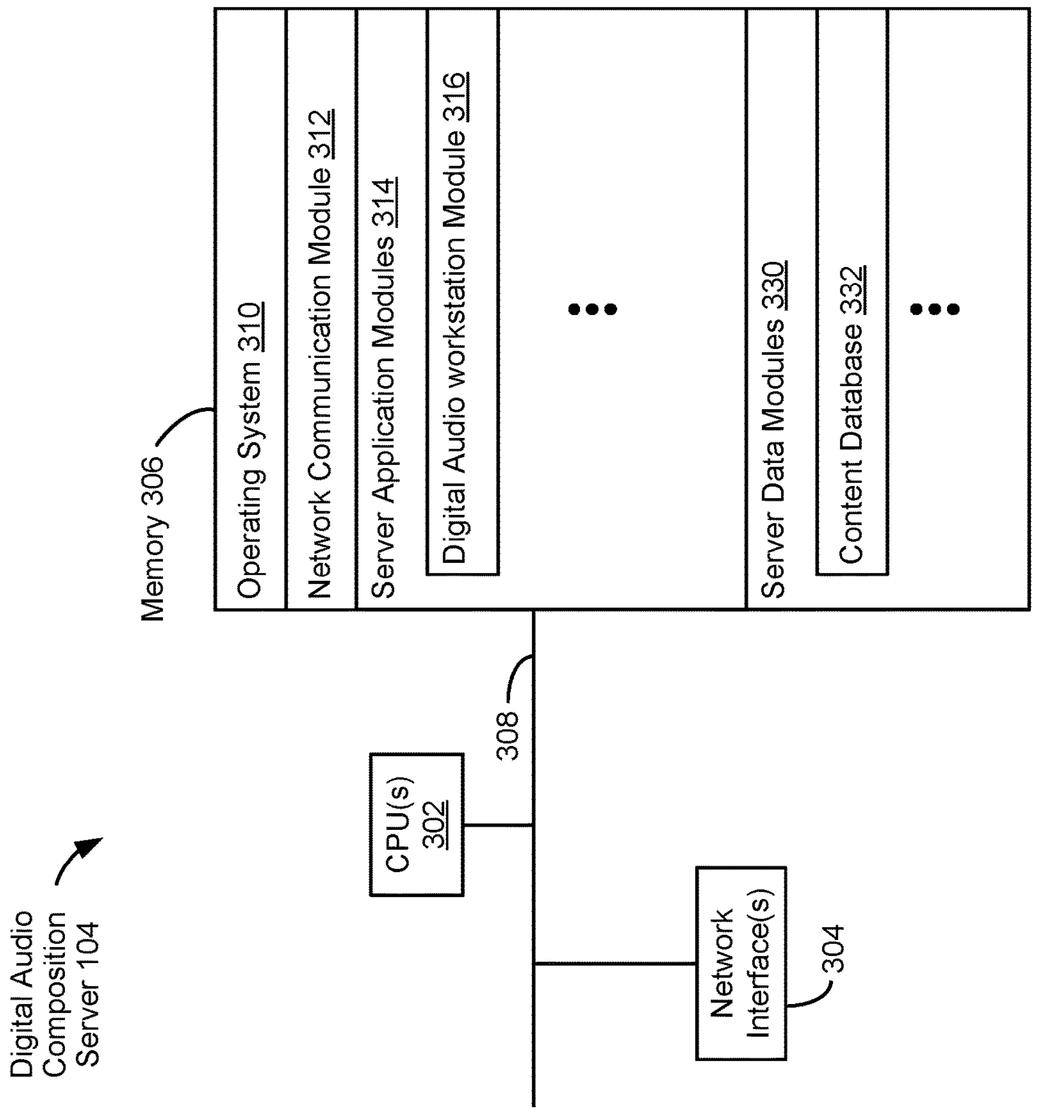
FIG. 3 is a block diagram illustrating a digital audio composition server, in accordance with some embodiments.

FIG. 3 is a block diagram illustrating a digital audio composition server 104, in accordance with some embodiments. The digital audio composition server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the digital audio composition server 104 to other computing devices via one or more network interfaces 304 (wired or wireless) connected to one or more networks 114;
- one or more server application modules 314 for performing various functions with respect to providing and managing a content service, the server application modules 314 including, but not limited to, one or more of:
  - digital audio workstation module 316 which may share any of the features or functionality of digital audio workstation module 222. In the case of digital audio workstation module 316, these features and functionality are provided to the client device 102 via, e.g., a web browser (web browser application 228);
- one or more server data module(s) 330 for handling the storage of and/or access to media items and/or metadata relating to the audio compositions; in some embodiments, the one or more server data module(s) 330 include a media content database 332 for storing audio compositions.

In some embodiments, the digital audio composition server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, memory 212 stores one or more of the above identified modules described with regard to memory 306. In some embodiments, memory 306 stores one or more of the above identified modules described with regard to memory 212.

Although FIG. 3 illustrates the digital audio composition server 104 in accordance with some embodiments, FIG. 3 is intended more as a functional description of the various features that may be present in one or more digital audio composition servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the digital audio composition server 104, and how features are allocated among them, will vary from one implementation to another and, optionally, depends in part on the amount of data traffic that the server system handles during peak usage periods as well as during average usage periods.

Figure 4:
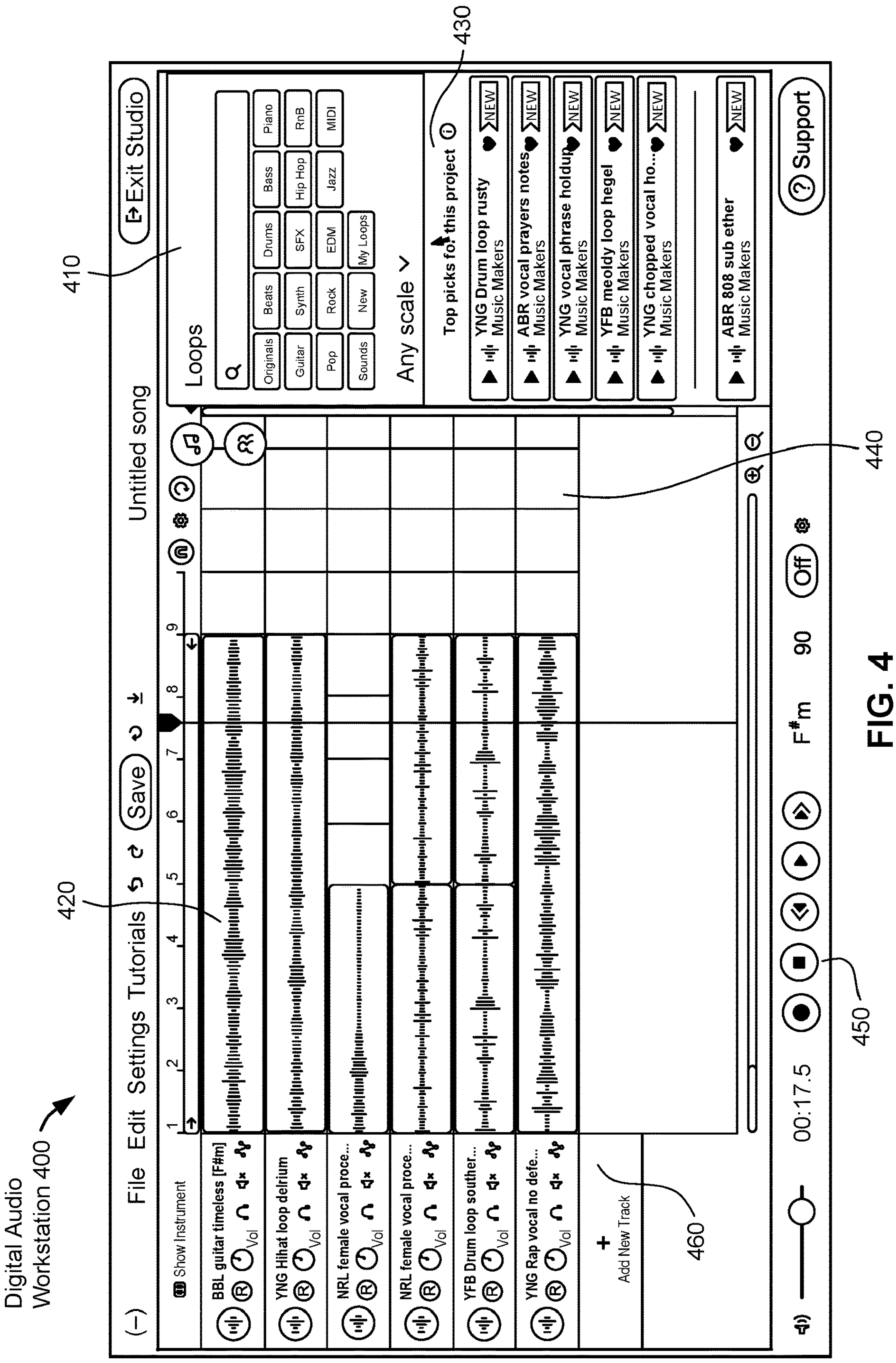
FIG. 4 illustrates an example of a graphical user interface for a digital audio workstation, in accordance with some embodiments.

FIG. 4 illustrates an example of a graphical user interface 400 for a digital audio workstation (DAW) that includes a recommendation region 430, in accordance with some embodiments. In particular, FIG. 4 illustrates a graphical user interface 400 comprising a user workspace 440. The user may add different compositional segments and edit the added compositional segments 420. For example, the user may select, from Loops region 410, a loop to add to the workspace 440. For example, when a selected loop is added to the workspace, the loop becomes the compositional segment. In some embodiments, a selected loop is an audio file. In some embodiments, a selected loop is a MIDI file.

The one or more compositional segments 420 together form a composition. In some embodiments, the one or more compositional segments 420 have a temporal element wherein an individually specified compositional segment is adjusted temporally to either reflect a shorter segment of the compositional segment or is extended to create a repeating compositional segment. In some embodiments, the compositional segment is adjusted by dragging the compositional segments forward or backward in the workspace 440. In some embodiments, the compositional segment is cropped. In some embodiments, the compositional segment is copied and pasted into the workspace 440 to create a repeating segment.

In some embodiments, compositional segments are edited by an instrument profile section 460. The instrument profile section 460 may comprise various clickable icons, in which the icons correspond to characteristics of the one or more compositional segments 420. The icons may correspond to the volume, reverb, tone, etc., of the one or more compositional segments 420. In some embodiments, the icons may correspond to a specific compositional segment in the workspace 440, or the icons may correspond to the entire composition.

In some embodiments, the graphical user interface 400 includes a recommendation region 430. The recommendation region 430 includes a list of suggested loops (e.g., audio files or MIDI files) that the user can add (e.g., by clicking on the loop, dragging the loop into the workspace 440, or by clicking on the "Add New Track" option in the instrument profile section 460).

In some embodiments, the DAW may comprise a lower region 450 for playing the one or more compositional segments together, thereby creating a composition. In some embodiments, the lower region 450 may control playing, fast-forwarding, rewinding, pausing, and recording additional instruments in the composition.

In some embodiments, the user creates, using the DAW (e.g., by recording instruments and/or by using the loops) a source audio file from the composition (e.g., source audio file is a track in a composition). In some embodiments, the user uploads a source audio file to the DAW (e.g., as an MP3, MP4, or another type of audio file).

In some embodiments, the DAW receives a target MIDI file (e.g., a MIDI file). For example, in some embodiments, the user creates the target MIDI file (e.g., by selecting a MIDI loop from the Loops 410 and/or by recording an input in MIDI file format). In some embodiments, the target MIDI file is displayed in the DAW as a separate compositional segment of FIG. 4 (e.g., a separate track in the composition). In some embodiments, the DAW further includes a region for selecting different audio styles to be applied to a MIDI file.

In some embodiments, as described in more detail below with reference to FIGS. 5A-5B, the DAW mixes a target MIDI file and the source audio file (e.g., which are indicated and/or recorded by the user of the DAW). In some embodiments, before the mixing, the system applies an audio style (e.g., a SoundFont™) to the target MIDI file to generate a series of sounds and segments the source file into audio events of various lengths.

Figure 5A:
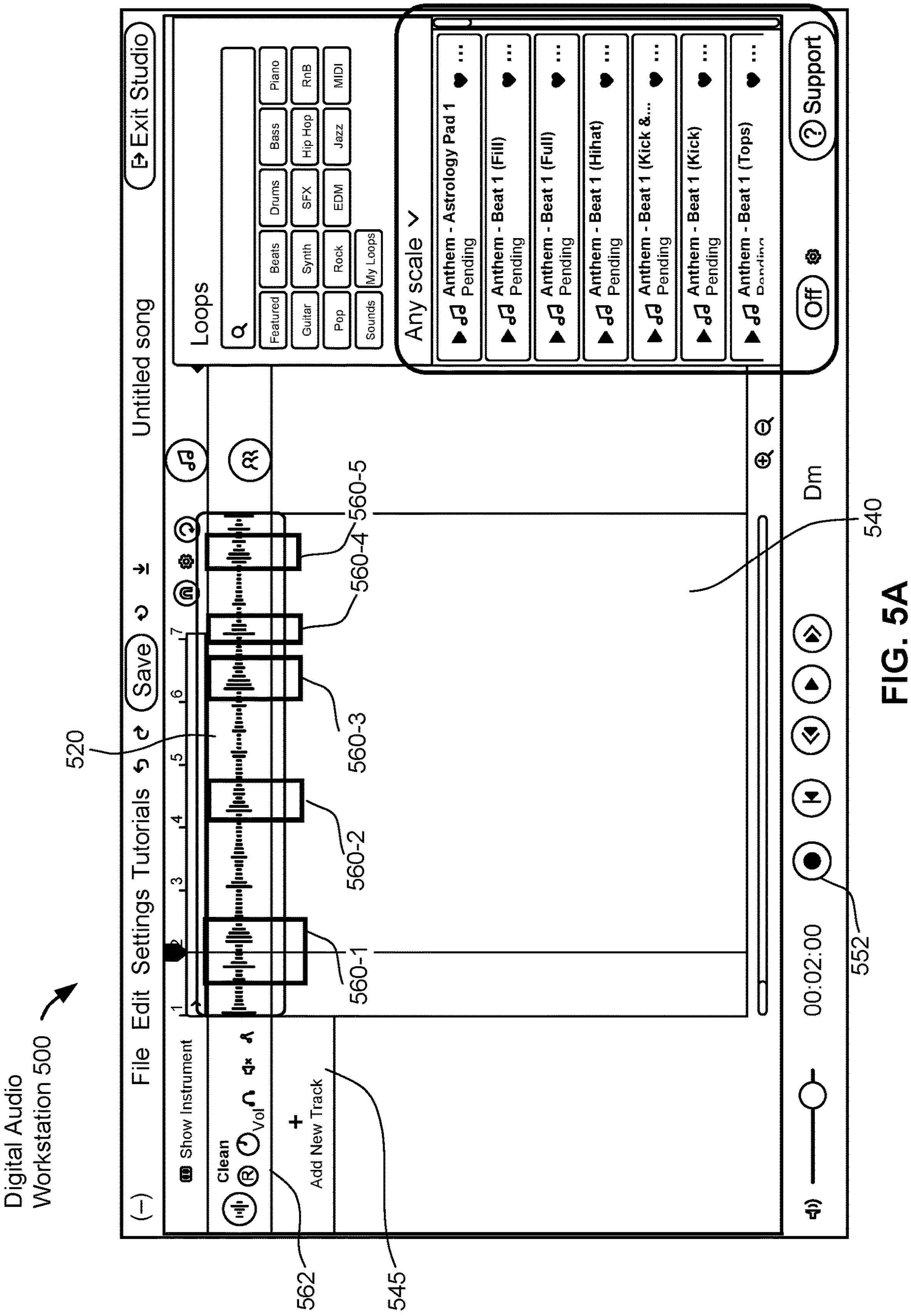
FIGS. 5A-5B illustrate a graphical user interface for a digital audio workstation that includes an audio file and a representation of a MIDI file, in accordance with some embodiments.
Figure 5B:
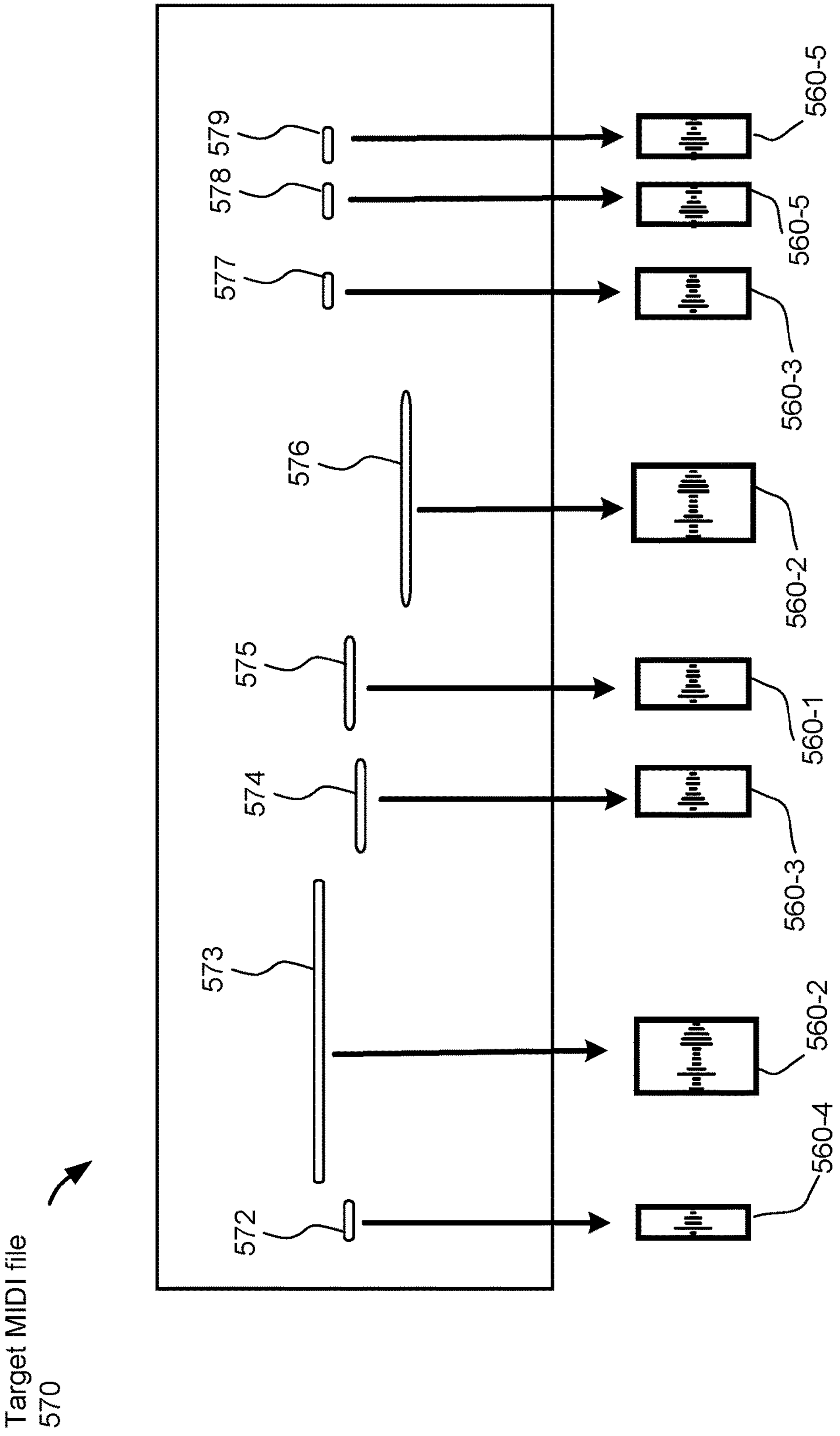

FIGS. 5A-5B illustrate examples of a graphical user interface 500 for a DAW. The DAW includes a workspace 540 comprising a source audio file 520. In some embodiments, the source audio file 520 has a corresponding instrument profile section 562 (e.g., through which a user can apply an audio style that modifies the acoustic effects (e.g., reverberation) of the audio content in the audio file). In some embodiments, the user records the source audio file 520 using record button 552. For example, a user is enabled to input (e.g., record) instrumental sounds (e.g., vocals, drums, etc.) in the DAW, which are used to generate the source audio file 520. In some embodiments, the user uploads (or otherwise inputs) the source audio file 520 (e.g., without recording the source audio file 520 within the DAW). In some embodiments, the user creates the source audio file using a plurality of loops (e.g., and compositional segments), as described above with reference to FIG. 4. In some embodiments, a new compositional segment is added, or a new composition is recorded, by selecting the "Add New Track" icon 545.

In some embodiments, the DAW displays a representation of a series of notes as a MIDI file (e.g., target MIDI file 570, shown in FIG. 5B is included in the user interface of the DAW (e.g., as another track)). In some embodiments, the user selects the MIDI file as a target MIDI file 570, as described in more detail below. For example, the user selects the target MIDI file 570 (e.g., selects a loop having a MIDI file format, as described above with reference to FIG. 4) and imports the source audio file 520 before instructing the DAW to mix the target MIDI file with the source audio file. In some embodiments, the DAW includes an option (e.g., a button for selection by the user) to automatically mix the target MIDI file 570 with portions of the source audio file, as described with reference to FIGS. 6A-6C.

In some embodiments, in response to the user requesting to combine the source audio file with the target MIDI file 570, the source audio file 520 is segmented (e.g., divided or parsed) into a plurality of segments 560 (e.g., segment 560-1, segment 560-2, segment 560-3, segment 560-4, segment 560-5). In some embodiments, every (e.g., each) portion of the source audio file 520 is included in at least one segment. In some embodiments, as illustrated in FIG. 5A, only selected portions, less than all, of the source audio file 520 are included within the plurality of segments. In some embodiments, the DAW identifies segments that include prominent portions of the source audio file 520. For example, portions of the audio file 520 that include audio events are included in the segments. For example, each segment corresponds to an audio event of the source audio file 520 (e.g., where the source audio file 520 and each segment 560 includes audio data (e.g., sounds)). In some embodiments, audio events refer to sounds that can represent and replace a drum note (e.g., sound from tapping a table, a click sound, etc.). In some embodiments, the identified segments are different lengths.

FIG. 5B illustrates target MIDI file 570 having a series of sounds 572-579. In some embodiments, a series of notes of the initial target MIDI file are converted to audio sounds 572-579 using an audio style selected by the user (e.g., a SoundFont™). For example, the initial MIDI file includes instructions to play a series of notes (e.g., but does not include sounds, e.g., as waveforms), and the DAW generates the series of sounds representing the notes of the target MIDI file using the applied audio style (e.g., sounds 572-579 are generated by applying an audio style to the MIDI file). For example, the user selects which audio style to apply to the notes of a MIDI file (e.g., the user can select and/or change a SoundFont™ that is applied to the notes to generate sounds).

In some embodiments, for each sound in the series of sounds 572-579, a vector representing the sound is generated. To that end, for each sound in the series of sounds 572, a Mel spectrogram and Mel Frequency Cepstral Coefficients (MFCCs) are computed. In some embodiments, the number of MFCCs for generating the vectors is predetermined (e.g., 40 MFCCs, 20 MFCCs). In some embodiments, the calculated MFCCs are combined (e.g., using a weighted combination) with numerical values describing the low frequencies, middle frequencies, and high frequencies of the respective sound to generate the vector for the respective sound (e.g., sounds 572-579) in the MIDI file 570. In some embodiments, the numerical values are weighted differently for each frequency range (e.g., low frequency range, middle frequency range, and high frequency range). For example, based on the Mel Spectrogram (e.g., using 512 Mel-frequency banks), low frequency range is assigned to bank 0-20, middle frequency range is assigned to bank 21-120 and high frequency range is assigned to bank 121-512, where the values in a given bank are weighted according to the weights assigned to the respective frequency range (e.g., values assigned to the low frequencies bank are multiplied by a first weight, values assigned to the middle frequencies bank are multiplied by a second weight, and values assigned to the high frequencies bank are multiplied by a third weight, wherein the user is enabled to modify the weight applied to each frequency range). As such, the user is enabled to prioritize (e.g., by selecting a larger weight) sounds that fall within a certain frequency range. Accordingly, the vectors represent frequencies of the sounds of the target MIDI file 570. In some embodiments, the MFCCs are further combined with additional audio properties (e.g., using a weighted combination of numerical values representing the additional audio properties with the weighted MFCCs and/or the weighted numerical values describing the frequencies) to generate a vector representing each sound in the series of sounds 572-579. For example, the respective vector generated for a respective sound is further based on additional features of the sound, for example, a numerical value of the sound's acceleration, an energy function, the spectrum (e.g., the Mel spectrogram), and/or other perceptual features of the sound, such as timbre, loudness, pitch, rhythm, etc. In some embodiments, the respective vector includes information about the length of the sound. For example, the vector is generated using a weighted combination of the MFCCs, the numerical values describing the frequencies of the sounds, and/or other features of the sound. In some embodiments, the numerical values of the features of the sounds are normalized before performing the weighted combination to generate the vectors.

In some embodiments, the user is enabled to control one or more vector parameters (e.g., select the audio features used to generate the vectors). For example, the user is enabled to change (e.g., select) the parameters used to generate the vectors of the sounds and/or segments. In some embodiments, the user is enabled to change the weights used in the weighted combination to generate the vectors. For example, the user can select a greater weight for high and/or low frequencies, such that the closest vector match is based more on the selected high and/or low frequencies (e.g., rather than being based on other parameters of the sound and/or segment). In some embodiments, user interface objects representing features that can be used to generate the vectors are displayed for the user, such that the user may select which features of the sounds to include in the vector calculation and/or to change relative weights of the features.

Similarly, for each segment of the source audio file (e.g., segment 560-1, segment 560-2, segment 560-3, segment 560-4, segment 560-5), an analogous vector is generated using the same weighted combination of features that is used to calculate the vectors representing the sounds of the target MIDI file 570 (e.g., by computing a Mel spectrogram and/or the MFCCs, as described above). For example, the MFCCs, together with numerical values describing the segment's low frequencies, middle frequencies, and high frequencies are used to generate a vector for each segment (e.g., corresponding to an audio event) from the source audio file, as well as additional features (e.g., audio properties) of the segment.

Accordingly, the system computes and stores vectors representing the sounds generated from the MIDI file and vectors representing the segments of the source file. In some embodiments, a distance between vectors (e.g., a Euclidean distance) is determined (e.g., the distances between the vector for a respective sound and the vectors each of the segments). In some embodiments, from the determined distances, a probability is computed (e.g., by taking a predetermined number of segment vectors (e.g., less than all of the segment vectors) for each sound vector, and assigning a probability based on the distance (e.g., where a smaller distance results in a higher probability)). For example, the probability value for a segment vector is calculated as 1/distance (e.g., distance from the vector for the sound), normalized so that the sum of probabilities equal 1, or by some other mathematical calculation (e.g., wherein distance is inversely proportional to the probability). In some embodiments, for a given sound vector (e.g., for each sound of the target MIDI file), all of the segment vectors are assigned a probability.

The system selects, for each sound in the series of sounds in the target MIDI file 570, a segment (e.g., an audio event) from the source audio file 520. For example, sound 572 is mapped to segment 560-4, sound 573 is mapped to segment 560-2, sound 574 is mapped to segment 560-3, sound 575 is mapped to segment 560-1, sound 576 is mapped to segment 560-2, sound 577 is mapped to segment 560-3, sound 578 is mapped to segment 560-5 and sound 579 is mapped to segment 560-5. In some embodiments, a same segment is mapped to a plurality of sounds in the target MIDI file 570. In some embodiments, a length of the segment is not the same length as the length of the sound. Note that some vector parameters may depend on length. To that end, in some embodiments, when generating the vectors, the sounds and segments are normalized to be a common length (e.g., by padding either the sound or the segments, or both, with zeroes). Doing so does not affect the MFCCs, but, for other derivative features, penalizes differences in length when selecting a segment for each sound.

In some embodiments, the system selects the segment for each note using (i) a probability distribution or (ii) a best fit match mode of selection. For example, as explained above, for each sound in the MIDI file, a probability is assigned to a plurality of vectors representing the segments of the source audio file (e.g., a probability is assigned to a respective vector for each of the segments, or a subset, less than all of the segments).

For example, to select a segment for a sound using the probability distribution, the system determines, for the sound 572, a probability value to assign each of the segments 560-1, 560-2, 560-3, 560-4, and 560-5 (e.g., wherein the probability value is determined based on a distance (e.g., in vector space) between the vector representing the segment and the vector for the sound 572). The system selects, using the probability distribution created from the probability values for each of the segments 560-1, 560-2, 560-3, 560-4, and 560-5, a segment to assign to the sound 572. For example, in FIG. 5B, the segment 560-4 is selected and assigned to the sound 572. Note that the probability of segment 560-4 is not necessarily the highest probability (e.g., the selected segment is randomly selected according to the probability distribution). This allows for additional randomization within the generated audio file in which the series of sounds are replaced with the matched segment for each sound. For example, the segment assignments are selected according to the probability distribution, instead of always selecting the segment with the closest distance to the respective sound (e.g., which would have the highest probability in the probability distribution).

In some embodiments, the system selects the best fit segment (e.g., instead of selecting a segment according to the probability distribution). For example, the segment with the greatest probability (e.g., the closest segment in the vector space to the respective sound) is always selected because it is the best fit for the sound.

In some embodiments, for a target MIDI file 570, both of the probability distribution and the best fit match mode are used in selecting the segments to match to various sounds. For example, a portion of the sounds are matched to segments using the probability distribution mode, and another portion of the sounds are matched to segments using the best fit match mode (e.g., based on the type of sound). For example, certain types of sounds use the probability distribution mode of matching, while other types of sounds use the best fit match mode. For example, particular types of sounds (e.g., hi-hat and bass drum) of the MIDI file are assigned the best matching event (e.g., a segment) from the source audio file rather than selecting an event according to the probability distribution in order to maintain a beat (e.g., groove) of the target MIDI file 570. In some embodiments, the same mode is selected and used for assigning segments to each of the sounds in the target MIDI file.

In some embodiments, a sound is repeated in the MIDI file. For example, sound 577, sound 578, and sound 579 correspond to a repeated note in the target MIDI file 570. In some embodiments, the sounds in the repeated sounds are assigned to different segments. For example, different occurrences of a same sound may be assigned to different segments (e.g., determined based on a selection using the probability distribution). For example, sound 577 is assigned to segment 560-3, while sound 578 is assigned to segment 560-5.

In some embodiments, if there are multiple occurrences of a same sound, each occurrence of the sound is assigned to a same segment. For example, each of the occurrences of sound 577, sound 578, and sound 579 would be assigned to the segment 560-5. In some embodiments, the user is enabled to control whether to automatically assign the same segment to occurrences of a same sound within the MIDI file. For example, in response to a user selection to assign the same segment to each occurrence of the same sounds, any repeated sounds in the MIDI file will be assigned to the same segment (e.g., wherein the segment assigned to each of the sounds can be selected either according to the probability distribution or by the best fit match mode).

In some embodiments, the segments replace the sounds that were applied to the MIDI file (e.g., the audio from the selected segments is applied to the MIDI file instead of applying the audio style to the MIDI file). For example, each of the selected segments corresponds to a note of the initial MIDI file (e.g., without applying an audio style to create the sounds). In some embodiments, the segments are mixed (e.g., overlaid) with the sounds of the target MIDI file (e.g., without removing the audio style applied to the MIDI file). In some embodiments, the mixing is performed such that certain elements (e.g., drum elements, such as kick and hi-hat elements) are center panned (e.g., maintain the center frequency), while other elements are panned based on a volume adjustment needed for the respective segment (e.g., based on a difference in gain between the selected segment and the sound of the MIDI file).

Figure 6A:
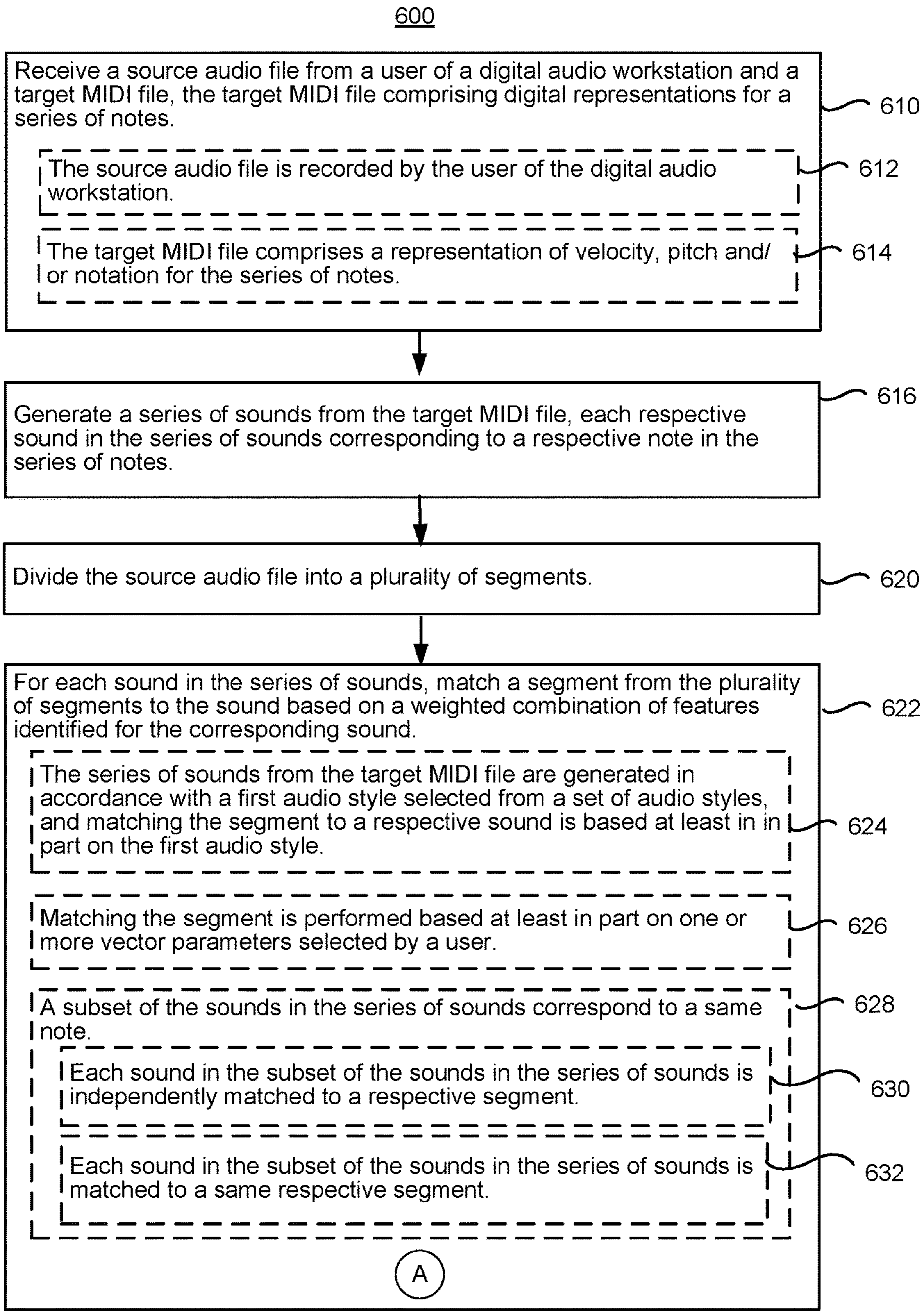
FIGS. 6A-6C are flow diagrams illustrating a method of generating an audio file from a source audio file and a target MIDI file, in accordance with some embodiments.
Figure 6B:
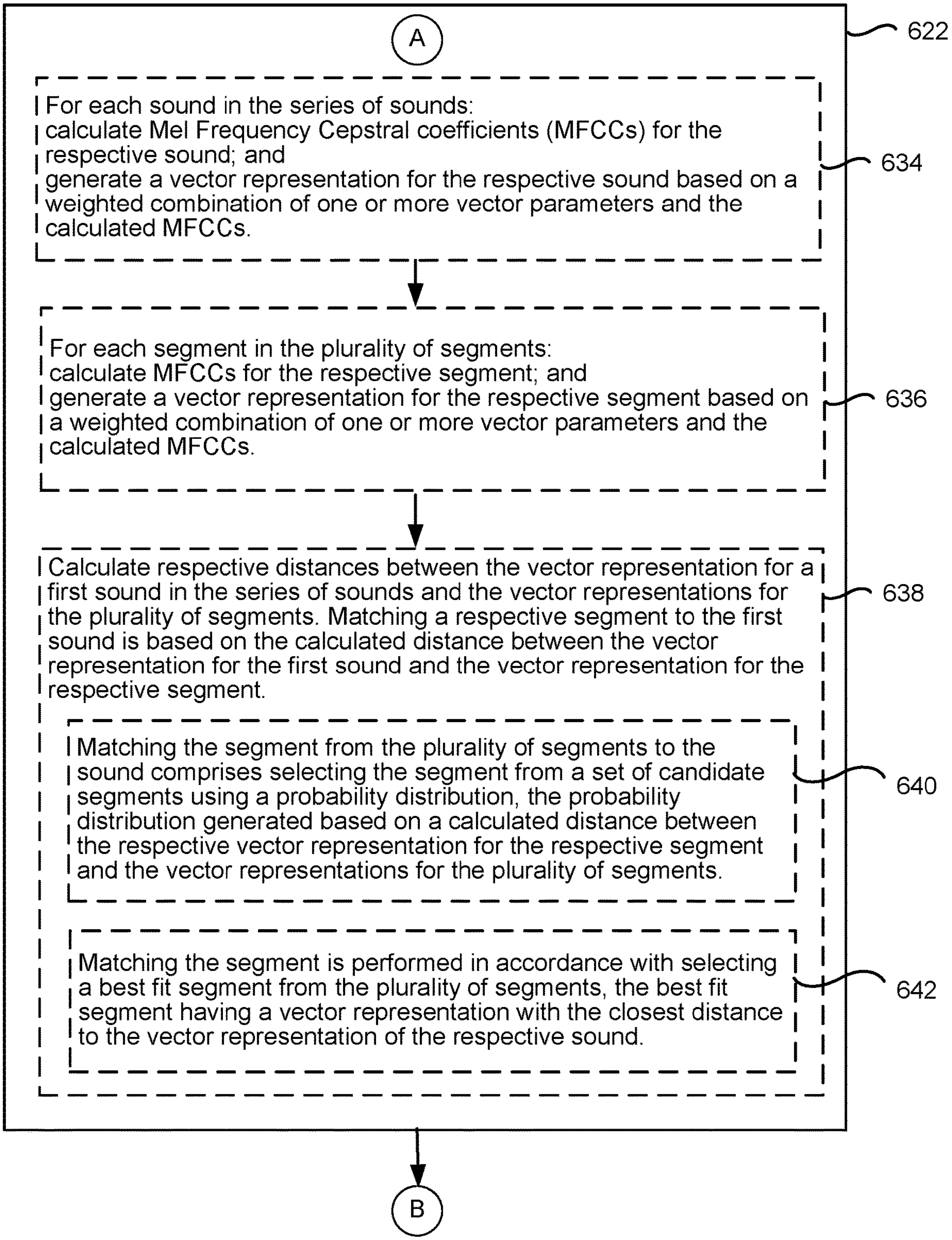
Figure 6C:
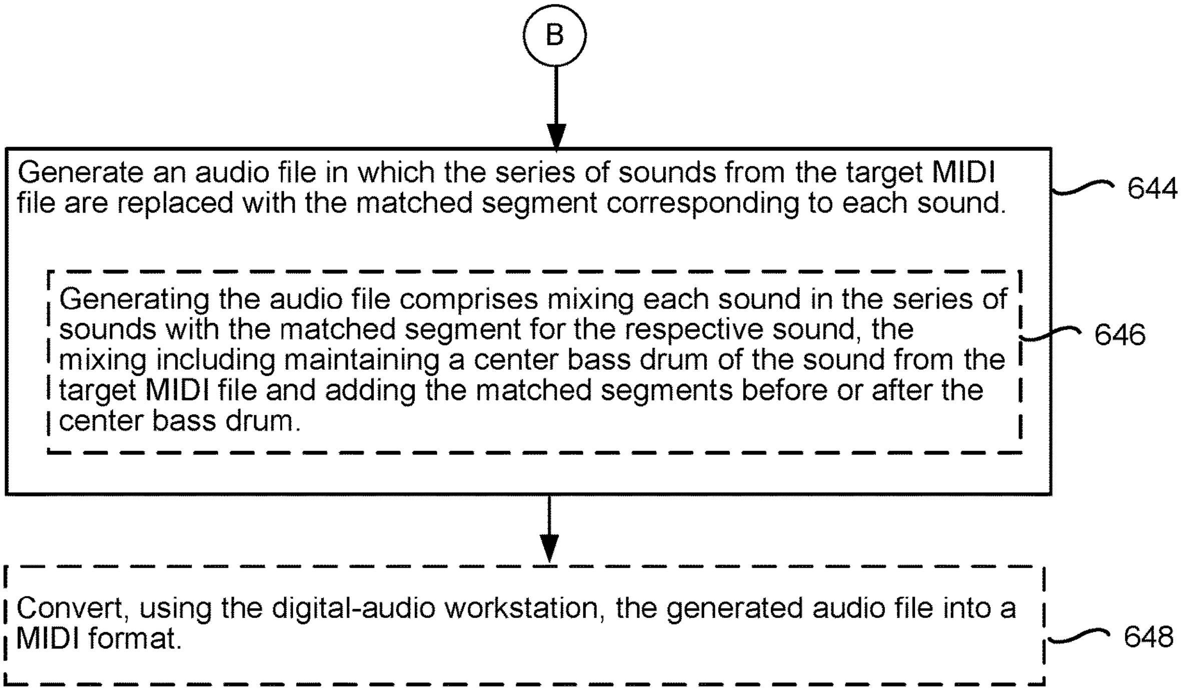

FIGS. 6A-6C are flow diagrams illustrating a method 600 of generating a mixed audio file in a digital audio workstation (DAW), in accordance with some embodiments. Method 600 may be performed at an electronic device (e.g., electronic device 102). The electronic device includes a display, one or more processors, and memory storing instructions for execution by the one or more processors. In some embodiments, the method 600 is performed by executing instructions stored in the memory (e.g., memory 212, FIG. 2) of the electronic device. In some embodiments, the method 600 is performed by a combination of a server system (e.g., including digital audio composition server 104) and a client electronic device (e.g., electronic device 102, logged into a service provided by the digital audio composition server 104).

The electronic device receives (610) a source audio file from a user of a digital audio workstation and a target MIDI file, the target MIDI file comprising digital representations for a series of notes. For example, the source audio file 520 in FIG. 5A is received from the user. In some embodiments, the target MIDI file (e.g., target MIDI file 570, FIG. 5B) is selected (e.g., or created) by the user (e.g., using a loop having MIDI file format and/or by recording notes in MIDI file format).

In some embodiments, the source audio file is recorded (612) by the user of the digital audio workstation. For example, the source audio file 520 includes the user's voice, instrument(s), and/or other audio inputs from the user (e.g., recorded in the DAW, or otherwise uploaded to the DAW). For example, the source audio file 520 is not in MIDI file format (e.g., the source audio file 520 includes audio sounds).

In some embodiments, the target MIDI file comprises (614) a representation of velocity, pitch and/or notation for the series of notes. For example, as explained above, the MIDI file 570 includes instructions for playing notes according to the representation of velocity, pitch and/or notation. In some embodiments, the target MIDI file is generated by the user.

The electronic device generates (616) a series of sounds (e.g., a plurality of sounds) from the target MIDI file, each respective sound in the series of sounds corresponding to a respective note in the series of notes. For example, as described above, the MIDI file is a representation of notes, but does not include actual sound within the MIDI file. Thus, the electronic device generates sounds for (e.g., by applying an audio style to) the notes of the MIDI file (e.g., before calculating a vector representing the sounds of the target MIDI file), to generate target MIDI file 570 with sounds 572-579.

The electronic device divides (620) the source audio file into a plurality of segments (e.g., candidate segments). For example, in FIG. 5A, a plurality of segments 560-1 through 560-5 are identified in the source audio file 520. Each of the segments corresponds to an audio event, as explained above.

For each sound in the series of sounds, the electronic device matches (622) a segment from the plurality of segments to the sound based on a weighted combination of features identified for the corresponding sound. For example, as described with reference to FIG. 5B, the electronic device identifies, for each sound 572 through 579 of the target MIDI file 570, a segment from the source audio file 520 (e.g., selected in accordance with a probability distribution or a best fit match).

In some embodiments, the series of sounds from the target MIDI file are generated (624) in accordance with a first audio style selected from a set of audio styles, and matching the segment to a respective sound is based at least in in part on the first audio style. For example, as described above, the instructions for playing notes are transformed into sounds by applying an audio style (e.g., SoundFont™) to the notes of the MIDI file, and the audio features of the resulting sounds are used to calculate the vectors for the sounds.

In some embodiments, matching the segment is performed (626) based at least in part on one or more vector parameters (e.g., audio features) selected by a user. For example, as described above with reference to FIG. 5B, the user is enabled to select and apply different weights to audio features used to generate the vectors (e.g., the user selects the weights to be applied to each numerical value for the high, middle and/or low frequencies when performing the weighted combination of the features to generate the vectors). In some embodiments, the user selects certain audio features to emphasize (e.g., give larger weights in the weighted combination) without specifying an exact weight to apply (e.g., the electronic device automatically, without user input, selects the weights based on the user's indications of which features to emphasize). Accordingly, the user is enabled to change the probability distribution (e.g., by changing how the vectors are generated according to different vector parameters (e.g., audio features)).

In some embodiments, a subset of the sounds in the series of sounds correspond (628) to a same note. For example, the same note (or series of notes) is repeated in the series of sounds of the target MIDI file, for example sounds 577, 578 and 579 correspond to a same note in FIG. 5B.

In some embodiments, each sound in the subset of the sounds in the series of sounds is (630) independently matched to a respective segment (e.g., each instance of the sound in the series of sounds is assigned a different segment). For example, the system matches sound 577 to segment 560-3 (e.g., by using the probability distribution mode of selection), and the system identifies a match for sound 578 (e.g., using the probability distribution mode of selection) as segment 560-5.

In some embodiments, each sound in the subset of the sounds in the series of sounds is (632) matched to a same respective segment. For example, every time the same sound (e.g., corresponding to a same note) appears in the target MIDI file, it is replaced by the same selected segment. For example, sounds 577, 578, and 579 in FIG. 5B would each be replaced by the same selected segment (e.g., segment 560-5). In some embodiments, the segment selected to replace each instance of the repeated sound is selected using the probability distribution mode of selection (e.g., once a segment is matched to a first instance of the sound, the system forgoes matching the other instances of the repeated sound and assigns each instance to the same sound selected for the first instance of the sound). In some embodiments, the segment selected to replace each instance of the repeated sound is selected using the best fit mode of matching (e.g., the segment with the highest probability is selected). For example, in practice, the system would always select the same segment having the highest probability for each instance of the repeated sound using the best fit mode of selection.

In some embodiments, for each sound in the series of sounds (634), the electronic device (e.g., or a server system in communication with the electronic device) calculates Mel Frequency Cepstral coefficients (MFCCs) for the respective sound and generates a vector representation for the respective sound based on a weighted combination of one or more vector parameters and the calculated MFCCs (e.g., the MFCCs, frequencies, and other audio properties).

In some embodiments, for each segment in the plurality of segments (636), the electronic device calculates Mel Frequency Cepstral coefficients (MFCCs) for the respective segment and generates a vector representation for the respective segment based on a weighted combination of one or more vector parameters and the calculated MFCCs. For example, as described with reference to FIG. 5B, the electronic device generates vectors for each segment 560 based on a weighted combination of the MFCCs and the vector parameters (e.g., audio properties) that can be modified by the user.

In some embodiments, the electronic device calculates (638) respective distances between the vector representation for a first sound in the series of sounds and the vector representations for the plurality of segments, wherein matching a respective segment to the first sound is based on the calculated distance between the vector representation for the first sound and the vector representation for the respective segment. In some embodiments, the electronic device receives a user input modifying a weight for a first matching parameter of the one or more vector parameters. For example, as described above, the user selects the one or more vector parameters and/or changes a weight to apply to the one or more vector parameters. For example, the user is enabled to give more weight to one matching parameter over another matching parameter (e.g., to give more weight to high frequencies and a lower weight to a length (e.g., granularity) of the segments).

In some embodiments, matching the segment from the plurality of segments to the sound comprises (640) selecting the segment from a set of candidate segments using a probability distribution, the probability distribution generated based on a calculated distance between the respective vector representation for the respective segment and the vector representations for the plurality of segments. In some embodiments, the set of candidate segments comprises a subset, less than all, of the plurality of segments (e.g., the matched segment is selected from the 5 segments with the largest probabilities (e.g., the 5 closest vector segments)). In some embodiments, the set of candidate segments is all of the plurality of segments (e.g., any of the segments may be selected according to the probability distribution).

In some embodiments, matching the segment is performed (642) in accordance with selecting a best fit segment from the plurality of segments, the best fit segment having a vector representation with the closest distance to the vector representation of the respective sound (e.g., instead of the probability distribution). For example, the best fit match mode of selection described above with reference to FIG. 5B.

The electronic device generates (644) an audio file in which the series of sounds from the target MIDI file are replaced with the matched segment corresponding to each sound. In some embodiments, the replacing comprises overlaying (e.g., augmenting) the matched segment with the sound of the MIDI file (e.g., having the audio style). For example, the electronic device plays back the series of sounds of the target MIDI file concurrently with the generated audio file. In some embodiments, the generated audio file removes the audio style that was applied to the MIDI file and replaces the sounds of the MIDI file with the matched segments (e.g., with the audio sounds (e.g., audio events) in the matched segments).

In some embodiments, generating the audio file comprises (646) mixing each sound in the series of sounds with the matched segment for the respective sound. For example, the mixing includes maintaining a center bass drum of the sound from the target MIDI file and adding the matched segments before or after the center bass drum. For example, the frequency of the center bass drum is not adjusted, and the system adds, to the left and/or right of the center bass drum, the matched segments (e.g., audio events are added before and/or after the center bass drum). As such, in some embodiments, the a rhythm of the target MIDI file is maintained, while additional textures (e.g., the matched segments) are added to the target MIDI file. Accordingly, the electronic device generates an audio file that assigns segments of a source audio file received from the user to notes of a MIDI file, wherein the segments of the source audio file are selected automatically, without user input, in accordance with a similarity to a selected audio style of the target MIDI file.

In some embodiments, the electronic device converts (648), using the digital-audio workstation, the generated audio file into a MIDI format. In some embodiments, the user is further enabled to edit sounds in the generated audio file after the audio file has been converted back to MIDI format. As such, the user is enabled to iterate and modify the generated audio file (e.g., by changing vector parameters or combining another source audio file with the new MIDI format of the generated audio file (e.g., wherein the new MIDI format of the generated audio file becomes the target MIDI file to repeat the method described above)).

Although FIGS. 6A-6C illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A computer-implemented method, the computer-implemented comprising:

receiving, by one or more processors and originating from a digital audio workstation, a source audio file in an electronic source audio file format and a target MIDI file in an electronic MIDI file format, the target MIDI file comprising digital representations for a series of notes;

generating, by the one or more processors, a series of sounds from the target MIDI file by applying a first audio style from a library of audio styles to the target MIDI file, each respective sound in the series of sounds corresponding to a respective note in the series of notes;

segmenting, by the one or more processors, the source audio file into a plurality of segments;

for each sound in the series of sounds, matching, by the one or more processors and based at least in part on the first audio style, a segment from the plurality of segments to the respective sound based at least in part on a weighted combination of features identified for the respective sound; and generating, by the one or more processors, an audio file in an electronic audio file format by replacing the matched segment corresponding to each sound with the series of sounds from the target MIDI file, wherein the audio file is provided to the digital audio workstation and is configured to be output by the digital audio workstation to one or more speakers.

2. The computer-implemented method of claim 1, wherein the first audio style is received as input from a user of the digital audio workstation.

3. The computer-implemented method of claim 1, wherein matching the segment is performed based at least in part on one or more vector parameters selected by a user.

4. The computer-implemented method of claim 1, wherein the source audio file is recorded by a user of the digital audio workstation.

5. The computer-implemented method of claim 1, wherein the target MIDI file comprises a representation of velocity, pitch and/or notation for the series of notes.

6. The computer-implemented method of claim 1, further comprising:

for each sound in the series of sounds:

calculating Mel Frequency Cepstral coefficients (MFCCs) for the respective sound; and generating a vector representation for the respective sound based at least in part on a weighted combination of one or more vector parameters and the calculated MFCCs;

for each segment in the plurality of segments:

calculating MFCCs for the respective segment; and generating a vector representation for the respective segment based at least in part on a weighted combination of one or more vector parameters and the calculated MFCCs; and calculating respective distances between the vector representation for a first sound in the series of sounds and the vector representations for the plurality of segments, wherein matching a respective segment to the first sound is based at least in part on the calculated distance between the vector representation for the first sound and the vector representation for the respective segment.

7. The computer-implemented method of claim 6, wherein matching the segment from the plurality of segments to the sound comprises selecting the segment from a set of candidate segments using a probability distribution, the probability distribution generated based at least in part on a calculated distance between the respective vector representation for the respective segment and the vector representations for the plurality of segments.

8. The computer-implemented method of claim 6, wherein matching the segment is performed in accordance with selecting a best fit segment from the plurality of segments, the best fit segment having a vector representation with a closest distance to the vector representation of the respective sound.

9. The computer-implemented method of claim 1, wherein generating the audio file comprises mixing each sound in the series of sounds with the matched segment for the respective sound, the mixing including maintaining a center bass drum of the sound from the target MIDI file and adding the matched segments before or after the center bass drum.

10. The computer-implemented method of claim 1, wherein, a subset of the sounds in the series of sounds correspond to a same note.

11. The computer-implemented method of claim 10, wherein each sound in the subset of the sounds in the series of sounds is independently matched to a respective segment.

12. The computer-implemented method of claim 10, wherein each sound in the subset of the sounds in the series of sounds is matched to a same respective segment.

13. The computer-implemented method of claim 1, further comprising, converting, using the digital audio workstation, the generated audio file into a MIDI format.

14. An electronic device, comprising:

a display;

one or more processors; and memory storing one or more programs, executable by the one or more processors, including instructions for:

receiving, originating from a digital audio workstation, a source audio file in an electronic source audio file format and a target MIDI file in an electronic MIDI file format, the target MIDI file comprising digital representations for a series of notes;

generating a series of sounds from the target MIDI file by applying a first audio style from a library of audio styles to the target MIDI file, each respective sound in the series of sounds corresponding to a respective note in the series of notes;

segmenting the source audio file into a plurality of segments;

for each sound in the series of sounds, matching, based at least in part on the first audio style, a segment from the plurality of segments to the respective sound based at least in part on a weighted combination of features identified for the respective sound; and generating an audio file in an electronic audio file format by replacing the matched segment corresponding to each sound with the series of sounds from the target MIDI file, wherein the audio file is provided to the digital audio workstation and is configured to be output by the digital audio workstation to one or more speakers.

15. The electronic device of claim 14, wherein the first audio style is received as input from a user of the digital audio workstation.

16. The electronic device of claim 14, wherein matching the segment is performed based at least in part on one or more vector parameters selected by a user.

17. The electronic device of claim 14, wherein the source audio file is recorded by a user of the digital audio workstation.

18. The electronic device of claim 14, wherein the target MIDI file comprises a representation of velocity, pitch and/or notation for the series of notes.

19. The electronic device of claim 14, the one or more programs further including instructions for:

for each sound in the series of sounds:

calculating Mel Frequency Cepstral coefficients (MFCCs) for the respective sound; and generating a vector representation for the respective sound based at least in part on a weighted combination of one or more vector parameters and the calculated MFCCs;

for each segment in the plurality of segments:

calculating MFCCs for the respective segment; and generating a vector representation for the respective segment based at least in part on a weighted combination of one or more vector parameters and the calculated MFCCs; and calculating respective distances between the vector representation for a first sound in the series of sounds and the vector representations for the plurality of segments, wherein matching a respective segment to the first sound is based at least in part on the calculated distance between the vector representation for the first sound and the vector representation for the respective segment.

20. A non-transitory computer-readable storage medium containing program instructions for causing an electronic device to perform a method of:

receiving, originating from a digital audio workstation, a source audio file in an electronic source audio file format and a target MIDI file in an electronic MIDI file format, the target MIDI file comprising digital representations for a series of notes;

generating a series of sounds from the target MIDI file by applying a first audio style from a library of audio styles to the target MIDI file, each respective sound in the series of sounds corresponding to a respective note in the series of notes;

segmenting the source audio file into a plurality of segments;

for each sound in the series of sounds, matching, based at least in part on the first audio style, a segment from the plurality of segments to the respective sound based at least in part on a weighted combination of features identified for the respective sound; and generating an audio file in an electronic audio file format by replacing the matched segment corresponding to each sound with the series of sounds from the target MIDI file, wherein the audio file is provided to the digital audio workstation and is configured to be output by the digital audio workstation to one or more speakers.

* * * * *